Sept. 17, 1968  R. L. EASTLAND  3,401,706
INSTRUMENT CLEANING MACHINES
Filed Oct. 4, 1966  2 Sheets-Sheet 1

Inventor
Raymond L. Eastland
By
Watson, Cole, Grindle & Watson
Attys.

Inventor
Raymond L. Eastland
By
Watson, Cole, Grindle & Watson
Attys.

United States Patent Office 3,401,706
Patented Sept. 17, 1968

3,401,706
INSTRUMENT CLEANING MACHINES
Raymond L. Eastland, Petersfield, England, assignor to Eastland Engineering Limited, Petersfield, England, a British company
Filed Oct. 4, 1966, Ser. No. 584,161
7 Claims. (Cl. 134—75)

The present invention relates to machines for cleaning articles such as instruments particularly surgical instruments and syringes used in hospitals.

The invention provides a completely automatic machine for processing instruments through a sequence of stages when they are fed into the machine.

Figure 1:
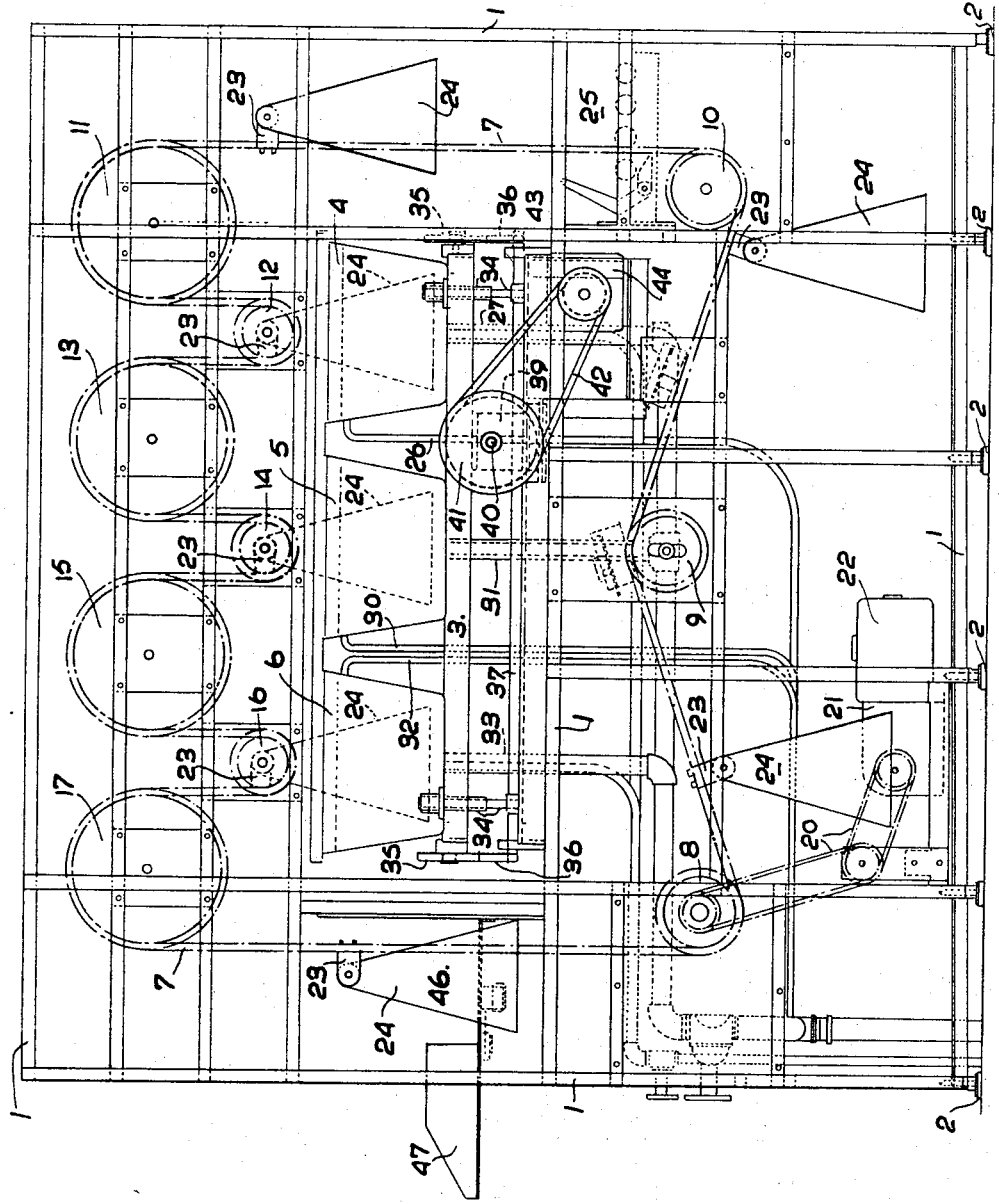
Figure 2:
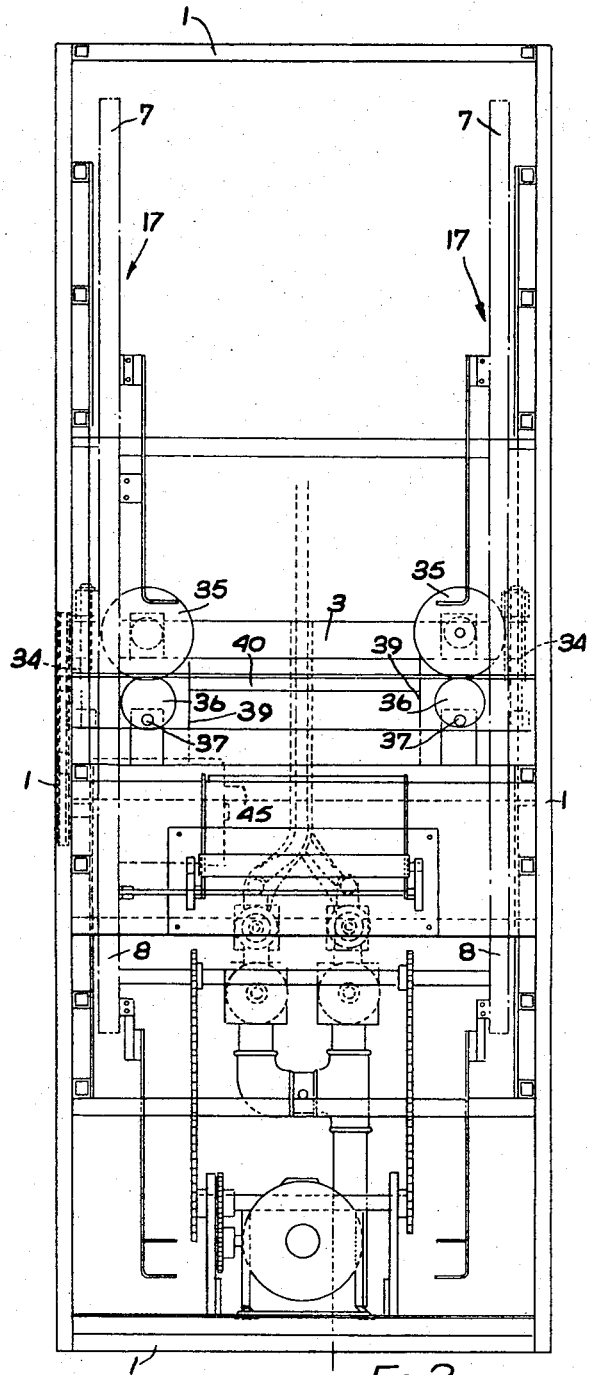

The various features and advantages of the invention will be apparent from the following description of a machine for cleaning surgical instruments embodying the invention, given by way of example and illustrated in the accompanying drawings of which FIGURE 1 is a side elevation of the machine and FIGURE 2 is an end elevation viewed from the left of FIGURE 1.

Referring to the drawings, the machine comprises a main frame 1 standing on feet 2 and, within frame 1, a support-table 3 on which are supported three cleaning tanks 4, 5 and 6. Encircling the table 3 is an endless chain conveyor 7 the chains of which extend over three pairs of sprockets 8, 9 and 10 beneath the table 3 and around seven pairs of sprockets 11 to 17 arranged above the tanks 4, 5 and 6. The sprocket pair 8 is driven by a chain drive 20 from a speed reduction gear 21 driven by an electric motor 22.

At intervals along the length of the chains of conveyor 7 are dogs 23 between each pair of which is pivotally attached a carrier 24 which is arranged to pick up a support frame on which instruments to be cleaned are arranged by an operator of the machine, from a loading position 25 at which the operator loads such frames one at a time.

The arrangement of the chain of the conveyor 7 and the sprockets over which it is guided is such that from the loading position 25 each carrier 24, with its support frame of instruments, is conveyed upwardly to sprocket 11 and is then lowered into tank 4 which contains a suitable cleaning liquid supplied through a pipe system 26 and exhausted through a pipe system 27 and agitated by an ultrasonic agitating device (not shown) of conventional form.

After a suitable dwell period in tank 4, the carrier 24 is raised from this tank and lowered into tank 5 as the chain of the conveyor 7 moves round sprocket 13.

Between sprockets 11 and 13 the chains pass round a pair of sprockets 12, the radius of each of which is arranged to be equal to the distance between the attachment point of each dog 23 to the conveyor chain and the pivot point of the carrier 24 on such dog. Also the spacing between the centres of sprockets 11 and 13 is equal to the sum of the diameters of one of these sprockets and that of a sprocket 12 so that as each dog 23 passes from the horizontal centre line of sprocket 11 to that of sprocket 13 the carrier 24 supported from such dog executes a vertical reciprocating movement into and out of tank 4 without being displaced horizontally.

This arrangement of sprocket size and spacing is repeated for the group of sprockets 13, 14, 15 above tank 5 and again for the group of sprockets 15, 16, 17 above tank 6 and the result is that a minimum spacing between the tanks is achieved thereby permitting a very compact arrangement within the machine.

Tank 5 contains a suitable rinsing liquid supplied and exhausted through pipe systems 30 and 31 and tank 6 contains a final rinsing liquid supplied and exhausted by pipe systems 32 and 33. Each of the tanks 4, 5 and 6 may be further equipped with an electric heater if required or the liquid in the tanks may be circulated by appropriate pumping arrangements through heat exchangers external to the machine.

The table 3 is supported in the frame 1 by means of four telescopic guide legs 34 and by wheels 35 at its four corners which rest upon cam discs 36 eccentrically mounted on the ends of two shafts 37 supported in bearings 38 from the frame 1. The shafts 37 each pass through an individual gear arrangement 39, the two arrangements 39 being driven by a common transverse shaft 40 having a pulley 41 on one end thereof. The pulley 41 is coupled by a belt 42 to a further pulley 43 on the output shaft of a speed reduction unit 44 driven by an electric motor 45, the arrangement being such that while the motor 45 is running the shafts 37 are rotated at such a speed that the table 3 is vertically oscillated by the cam discs 36 at a rate of twenty-two times per minute. The eccentricity of the cam discs 36 is such that the amplitude of such oscillation is about two inches. As a result, the liquids in the tanks 4, 5 and 6 are oscillated with respect to the carriers 24 while the latter are immersed in the liquids in the tanks and this has been found to substantially improve the cleansing and rinsing action of the liquids in the tanks and to break up any standing wave patterns produced by the ultrasonic agitators.

After the chains of the conveyor 7 pass over sprocket pair 17 they descend past an off-loading station 46 at which the support frames carrying the now clean instruments are detached from the carriers 24 and deposited on off-load rollers to emerge from the machine along a chute 47. The chains continue downwardly to pass round drive sprocket pair 8.

The levels, circulation, supply and exhausting of different liquids in, to and from the tanks 4, 5 and 6 are controlled by valves such as 50 and 51 in the various pipe systems, the sources of supply and/or drainage facilities for these purposes being external to the machine are not shown in the drawings. At least those sections of the various pipe systems which are connected to the tanks 4, 5 and 6 are flexible to permit oscillation of the tanks without damage to the pipe systems.

In a typical cycle of operations of the machine, a support frame loaded with instruments to be cleaned is inserted into the machine at the loading position 25 and the main drive motor 22, the motor 45 for oscillating table 3, and the ultrasonic vibrators are all switched on.

The conveyor is driven by drive sprockets 8 and a carrier 24 picks up the loaded support frame from position 25 and moves it upwardly, round sprocket 11 and then lowers it into tank 4. When the carrier is at its lowermost position in tank 4 the drive motor 22 is switched off for a dwell period of five minutes either manually or by an automatic programming arrangement of conventional form.

Motor 22 is then re-operated for a sufficient time to raise the carrier 24 out of tank 4 to the upper limit of the vertical reciprocating movement earlier referred to, at which point the motor 22 is stopped for fifteen seconds to permit draining of the cleaning liquid off the carrier, support frame and instruments back into tank 4.

Motor 22 is then again re-operated for a sufficient time move the carrier to its lowermost position in tank 5 whereupon the motor is again stopped for a dwell period of five minutes. Conveniently the spacing of successive pairs of dogs 23 on the chains of the conveyor 7 is such that as one carrier 24 reaches the lowermost position in tank 5 another carrier 24 has reached a corresponding position in tank 6 and yet another has reached a corresponding position in tank 4. In this way if each carrier in turn is loaded with a support frame of instruments, three such frames of instruments can remain one in each of the three tanks 4, 5 and 6 during the five minute dwell period and each of the three frames is arrested in a corresponding draining position during the subsequent pause of fifteen seconds before it moves on to the next stage of the process.

After successive dwell periods of five minutes in each of the tanks 4, 5 and 6, and successive pauses of fifteen seconds for draining purposes, the carrier 24 passes round sprocket 17 and deposits its frame of instruments at the off loading position 46.

In the foregoing description the preferred mode of operating the machine is given for a particular case but it will be appreciated that the rate of oscillation of the table may be varied from the example rate of 22 times per minute given in the description to suit different types of articles being cleaned or different cleaning liquids. Equally the dwell periods in the tanks and the pause period for draining are given only as examples of what has been found most useful in practice and they may be varied to suit other circumstances.

What I claim is:

1. A machine for cleaning articles by successively immersing articles to be cleaned in one or more containers for cleaning liquid, said machine including an endless conveyor having at least one arm attached to and projecting from the endless member of the conveyor to provide a pivot point at a fixed distance from the point of attachment to said member, said conveyor including two spaced upper circular guide members for said endless member and one lower circular guide member for said endless member disposed below said upper guide member and in register with the space between them, the radius of said lower guide member being equal to said fixed distance and the spacing between said upper guide members being equal to the diameter of said lower guide member whereby the locus of said pivot point is a vertical straight line extending between the horizontal plane through the centre of said lower guide member and that through the centres of said upper guide members.

2. A machine according to claim 1 having a plurality of containers for cleaning liquid and wherein said conveyor includes a group of said two upper and one lower guide members disposed above each such container so that the pivot point of said arm, or each said arm executes a vertical reciprocatory movement towards and away from each container in turn as said endless member is driven during operation of the machine.

3. A machine according to claim 2 wherein said container or each said container is mounted on a support table arranged to be oscillated in the vertical direction relative to the main support structure of the machine on which said guide members are mounted.

4. A machine according to claim 3 wherein said support table is arranged to be oscillated with an amplitude of approximately two inches at a rate of twenty-two lines per minute during operation of the machine.

5. A machine according to claim 4 wherein said container or at least one said container has mounted therein an ultrasonic agitating device for agitating the liquid in such container.

6. A machine according to claim 5 wherein said conveyor member comprises a pair of spaced conveyor chains each having a plurality of said arms attached thereto at corresponding positions spaced along the length of said chains and having carriers for articles to be cleaned pivotally suspended from corresponding pairs of said arms at said pivot points of said arms and wherein said upper and lower guide members are pairs of chain sprockets engaging said chains.

7. A machine according to claim 6 wherein the spacing of the corresponding pairs of arms along said chains is such that in the course of movement of such chains one pair of arms assumes its lowermost position above one of said containers at the same time as another such pair of arms assumes a corresponding position above another of said containers.

References Cited
UNITED STATES PATENTS 1,299,624    4/1919    Schuessler     134—75 XR

FOREIGN PATENTS 544,861    2/1932    Germany.

ROBERT L. BLEUTGE, *Primary Examiner.*